United States Patent
Blanc et al.

(10) Patent No.: US 6,597,656 B1
(45) Date of Patent: *Jul. 22, 2003

(54) SWITCH SYSTEM COMPRISING TWO SWITCH FABRICS

(75) Inventors: Alain Blanc, Vence (FR); Sylvie Gohl, La Colle sur Loup (FR); Alain Saurel, Nice (FR); Bernard Brezzo, Nice (FR); Jean-Claude Robbe, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,006

(22) Filed: May 24, 1999

(30) Foreign Application Priority Data

May 29, 1998 (EP) ............................. 98480039

(51) Int. Cl.⁷ .............................. H04L 1/22
(52) U.S. Cl. .......................... 370/219; 370/220
(58) Field of Search ................. 370/351, 401, 370/403, 404, 405, 406, 422, 424, 425, 407, 352, 355, 219, 220

(56) References Cited

U.S. PATENT DOCUMENTS

| | | | | |
|---|---|---|---|---|
| 5,430,720 A | * | 7/1995 | Larsson et al. | 370/399 |
| 5,493,566 A | * | 2/1996 | Ljungberg et al. | 370/231 |
| 5,937,032 A | * | 8/1999 | Nummelin et al. | 370/242 |
| 6,118,776 A | * | 9/2000 | Berman | 370/351 |
| 6,411,599 B1 | * | 6/2002 | Blanc et al. | 370/219 |

FOREIGN PATENT DOCUMENTS

| | | |
|---|---|---|
| EP | 0 652 685 A | 5/1995 |
| WO | WO 95 30318 | 4/1994 |

OTHER PUBLICATIONS

IBM Technical Disclosure Bulletin, vol. 34, No. 10A, Mar. 1, 1992, pp. 464–465, XP000302372 *the whole document*.

Rathgeb E. P. et al.: The mainstreetxpress Core Services Node—A Versatile ATM Switch Architecture for the Full Service Network: IEEE Journal on Selected Areas in Communications, vol. 15, No. 5, Jun. 1997, pp. 795–806, XP000657033 *paragraph II.A* *paragraph III*.

* cited by examiner

Primary Examiner—Wellington Chin
Assistant Examiner—William Schultz
(74) Attorney, Agent, or Firm—Carlos Munoz-Bustamante (57) ABSTRACT

A switching system having at least two switch fabrics. Each fabric has a switch core and a set of SCAL (Switch Core Access Layer) receive and transmit elements. The switch cores are preferably located in the same physical area but the SCALs may be distributed in different physical areas. Port Adapters distributed at different physical areas are connected to the switch fabrics via a particular SCAL element so that each switch core can receive cells from any port adapter and conversely any port adapter may receive data from either switch core. Control logic assigns a particular switch core to one port adapter for normal operations while reserving the other switch core for use when the first core is out of service. Each switch core has a mask mechanism which uses the value in a mask register to alter a bitmap value which controls the routing process. The mask registers in the two switch cores are loaded with complementary values.

8 Claims, 5 Drawing Sheets

SWITCH SYSTEM COMPRISING TWO SWITCH FABRICS

TECHNICAL OF THE INVENTION

The invention relates to telecommunications and more particularly to a switch system having first and second Switch Fabrics each including a switch core and distributed Switch Core Access Layer (SCAL) elements.

BACKGROUND ART

Switching technology has made considerable use of traditional crossbar switches, which support high rates (up to 100 Gigabits and even more). Crossbar switches however present a so-called <<head of line blocking>> drawback which seriously limits the efficiency of the switching process. Additionally, crossbar switches are not suitable for handling small data packets, such as those used in Asynchronous Transfer Mode (A.T.M.) networks.

New switching techniques are thus required for handling the small packets of data sometimes used for transporting data, voice or video over telecommunication networks. Shared buffer switches have proven to be a very interesting direction of research. Shared buffer switching techniques support high switching rates and effective handling of small packets of data. In shared buffer switching, a central buffer is used for storing messages received from the input ports of the switch before they are switched (rerouted) towards the appropriate output ports. Each output port of the switch is associated with an output queue which stores the succession of addresses corresponding to the location of the different messages loaded in the central buffer prior to their extraction and delivery to the associated output port. The queuing process is located at the output level of the switch, which eliminates the <<head of line blocking>> drawback and also facilitates multicasting possibilities. Shared buffer switches can be enhanced by means of speed expansion and port expansion mechanisms. Examples of such shared buffer techniques can be found in European applications n° 97480057.5, 97480056.7, 97480065.8, 96480129.4, 96480120.3 assigned to IBM. Additional prior art documents relating to shared buffer switching techniques can be found in European applications n° 97480100.3, n° 97480098.9, n° 97480101.1, n° 97480099.7, n° 98480007.8 and n° 98480006.0.

The capabilities of shared buffer switches are obviously limited by the physical size of the shared buffer, which limits the number of cells which can be concurrently processed. Performance requirements and circuit complexity limits the size of the shared buffer that can be employed in a single electronic module.

Another problem is how to improve the availability of the switch, particularly when maintenance operations must be performed. It is highly desirable to be able to continue packet switching even when a maintenance operation is being performed on one part of the switching system, for example by replacing a card or performing a system upgrade.

The expansion in the size of telecommunication networks and in the number and type of transactions occurring on such networks tend to increase the need for introduction of fault tolerance mechanisms in a switching system. This is particularly true when the switching system is part of a satellite or other critical application. In these applications, it is essential that the packet routing process continue, even if at a reduced performance level, when a part of the switching system fails. Fault tolerance mechanisms are generally expensive since the number of required electronic modules is generally doubled. Some of the added cost of the duplicate modules may be justifiable if the duplicate components are utilized during normal switch operation and not just when a partial switch failure has occurred.

SUMMARY OF THE INVENTION

An object of the present invention is to provide a buffer expansion architecture which supports efficient combination of the buffering possibilities of first and a second individual switching modules.

Another object of the present invention is to provide a switch based on an architecture which supports continued operations even when a maintenance operation is being performed on one part of the switch.

It is another object of the present invention to provide a fault tolerant switch based on a first and a second switching structure which advantageously uses the resources of both structures in the normal operations, and which can still be used, with possibly reduced performance when one of the structures is out of service.

It is a further object of the present invention to provide a switch having two switching fabrics which may be continuously checked and which uses very simple port adapters designed to operate at the normal rate.

A switch according to the invention includes first and second switch fabrics. Each of the switch fabrics has a switch core and a switch core access layer (SCAL). Each SCAL includes a receive element connected to an input port of the switch core and a transmit element connected to an output port of the switch core. The switch also includes a set of receive port adapters and a set of transmit port adapters. The receive port adapters are connected to both SCAL receive elements while the transmit port adapters are connected to both SCAL transmit adapters. Switch control logic assigns each port adapter to one of the switch fabrics during normal switch operation but re-assigns it to the other of the switch fabrics when the first switch fabric is taken out of service for planned maintenance or due to a component or system failure.

DESCRIPTION OF A PREFERRED EMBODIMENT

Figure 1:
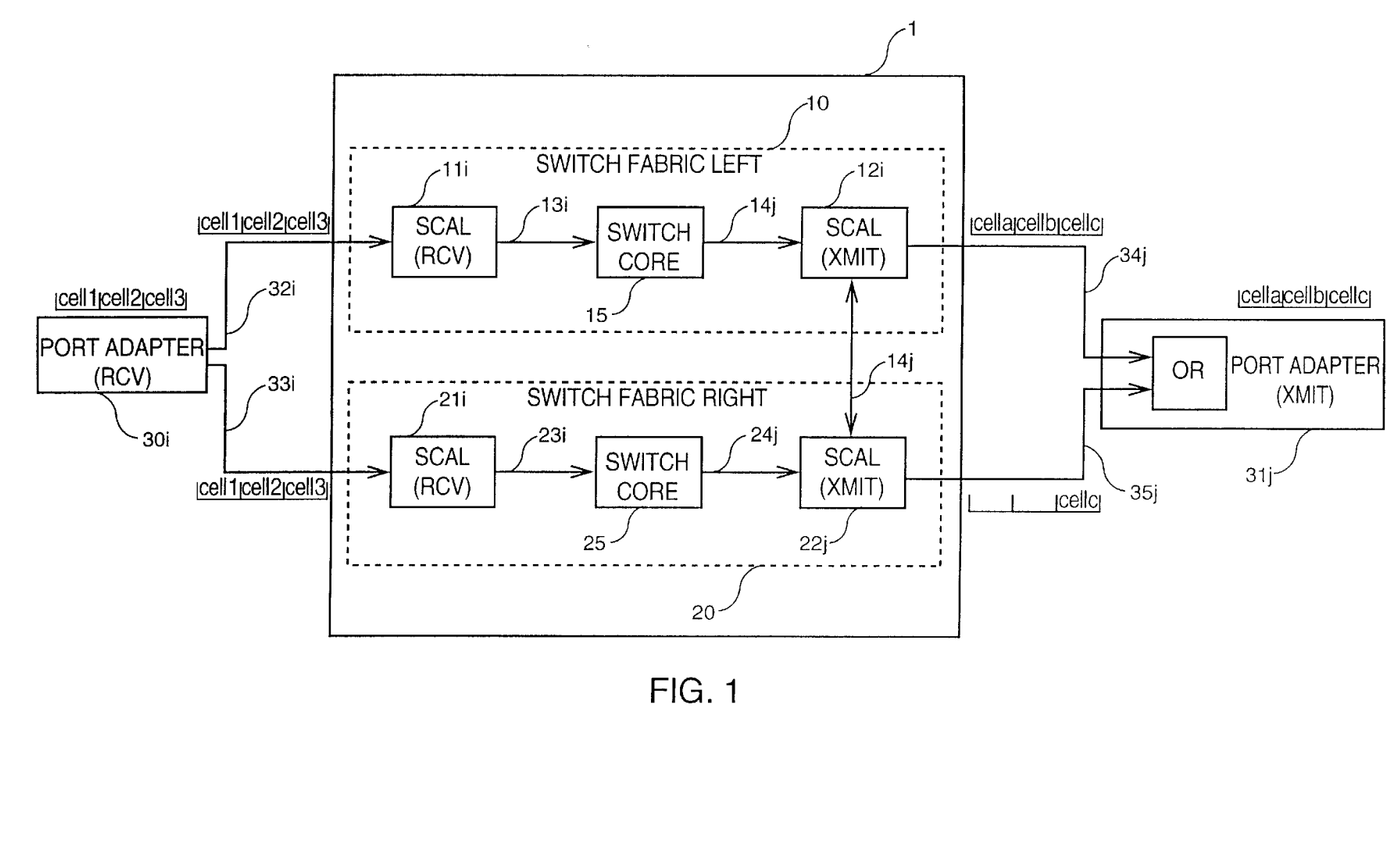
FIG. 1 illustrates the basic architecture of the invention using two shared buffer switching structures.

With respect to FIG. 1 there is shown a switch fabric structure capable of continuous availability. Switch subsystem 1 is composed of two individual and identical switch fabrics 10 and 20 that conform, in the preferred embodiment of the invention, to the teachings of the above mentioned European patent applications. However, it should be noticed that the concept of the invention can be used with other embodiments of switches based on a shared buffer, particularly switch fabrics that include queuing resources at the output of the switching components. Switch fabrics 10 and 20 include respectively switch cores 15 and 25, which are generally located in the same physical location and sets of Switch Core Access layers (SCAL) elements 11 and 12 (and respectively 21 and 22) which may be in different physical locations depending on the physical topology of the served network.

For the sake of simplicity, a single input port and a single output port are shown in FIG. 1. In a practical structure, there would be multiple input ports and multiple output ports. In the example, the receive side of the Switch Fabric is associated with port i, and consequently the SCAL receive elements, identified as elements 11-i and 21-i, are attached to port adapter 30-i. The output of the switch is said to be associated with an output port j. SCAL Xmit elements 12-j and 22-j respectively are attached to a port adapter 31-j.

From a functional point of view, Port Adapter Receive 30-i produces a sequence of cells, which are simultaneously transmitted to the corresponding SCAL receive element 11-i in the Switch Fabric 10 through the link 32-i; and to the SCAL receive 21-i in the Switch Fabric 20 through the link 33-i. Generally speaking each SCAL receive element 11-i and 21-i is connected to its corresponding switch core via a set of n serializing links 13-i and 23-i permitting the communication between the SCAL physical location and the switch core physical location Similarly, the two switch cores 15 and 25 are respectively connected to their corresponding SCAL transmit parts 12-j and 22-j via a set of n serialized links 14-j and 24-j. The cells which are produced by the two SCAL Xmit elements 12-j and 22-j are transported through the links 34-j and 35-j respectively to the Port Adapter (Xmit) 31-j.

Such an architecture permits the switching of cells when one of the two switch fabrics 10 or 20 is not operating, thereby allowing continuous availability of the overall switch. In a preferred embodiment, the PORT Adapter (Xmit) should be capable of receiving twice the flow of cells transmitted by one switch core.

Figure 2:
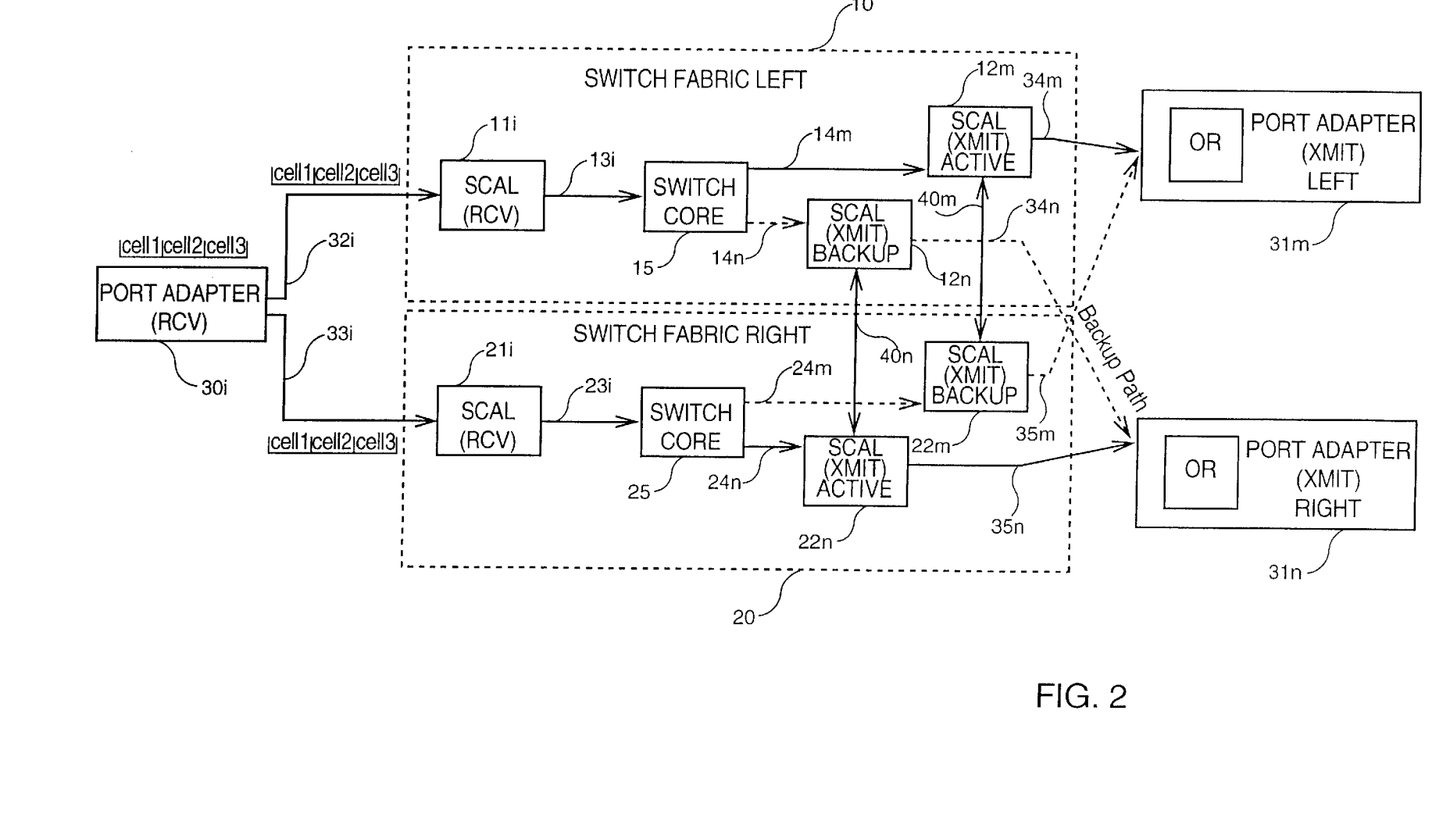
FIG. 2 is a more detailed view of the basic architecture showing backup paths.

Referring to FIG. 2, the invention shows a repartition of the output ports of the Switch Subsystem 1, and the Xmit Adapter elements in two groups: a group LEFT that will be assigned to SWITCH Fabric 10 (Left) and will normally receive the traffic cells from the latter; a group RIGHT that is affected to the SWITCH Fabric 20 and which normally receives the traffic cells from the latter. In the preferred embodiment of the invention, the continuous availability is achieved with two separate Left and RIGHT Switch Fabrics. However, it should be noticed that the system could be enhanced by increasing the number of switching paths.

In the figure the Port adapter Xmit 31(m) is assigned to the Left group while the Port adapter Xmit 31(n) is included in the RIGHT Group. Additionally, each Switch Fabric path, e.g. Switch Fabric 10, comprises SCAL Xmit elements that are divided into two groups—so called ACTIVE and BACKUP—corresponding to the repartition previously made of the PORT ADAPTER Xmit elements. More particularly a PORT Adapter Xmit 31(m)—that belongs to the LEFT group (assigned to the left switch path) is physically connected to a corresponding SCAL Xmit element 12(m) that belongs to the ACTIVE group of the Switch Fabric 10; and is further physically connected to a corresponding SCAL Xmit element 22(m) which belongs to the BACKUP group of the SWITCH Fabric 20.

Similarly, the PORT Adapter Xmit 31(n) that belongs to the RIGHT group assigned to the RIGHT Switch path is physically connected to a corresponding SCAL Xmit element 22(n) that belongs to the ACTIVE group of the SWITCH Fabric 20; and is further physically connected to a corresponding SCAL Xmit element 12(n) which belongs to the BACKUP group of the Switch Fabric 10.

The above described repartition of the PORT Adapter Xmit elements permits an effective and simultaneous operating of the switch cores 15 and 25. During the normal traffic, the repartition between the Port Adapter Xmit, decided by the Node manager, results in that the cells that are to be propagated to the Port Adapter Xmit 31(m) (belonging to the Left group) will be conveyed through Left Switch Core 15, to the SCAL Xmit element 12(m), while the same cell is duplicated by the PORT Adapter Receive 30(i) and will be dropped by the Switch core 25. Conversely, the cells that are to be propagated to the Port Adapter Xmit 31(n) (belonging to the Right group) will be conveyed through Right Switch Core 25, to the SCAL Xmit element 22(n), while the same cell being duplicated at the level of the PORT Adapter Receive 30(i) will be dropped by the Switch core 15. Therefore, the cells are being distributed through the two Right and Left Switch Fabrics in accordance with the repartition that was determined by the node manager.

This is achieved as followed. In the best mode of the invention, the cells which are generated by the PORT Adapter Receive 30i are duplicated on the two serial links 32(i) and 33(i). It should be noticed that this duplication is involved up to the input of the Switch Core 15 and 25. This is very important because the two cores must receive the same cells so as to make sure that the control cells are also simultaneously received. In the European patent applications mentioned above, there is described that the switch core uses routing table which provides with the bitmap information that is used inside the core for controlling the routing process. That bitmap information is generally read from the contents of Control Routing tables that can be updated by means of Control cells. This is the reason why it is important, in this invention, that the same cells arrive at the input of each Switch Core. More particularly, as described in the above mentioned patent applications, PORT Adapter receive 30(i) generates a cell which comprises a Switch Routing Header (SRH) and a payload; the latter SRH including a two-bytes Routing Label characteristics of the destination of the cell, that is to say the Port Adapter Xmit in case of Unicast connection or the set of Port Adapter Xmit in case of multicast connection, as well as a one-byte Cell Qualifier. The cells is then received by the local SCAL Receive element 11(i) and 21(i), which latter introduces an additional set of two bytes that will be affected to the location of the bitmap that will be used for controlling the internal routing process inside the switch core 15 and 25. The cells are then remotely transported to the centralized Switch Cores 15 and 25, the latter comprising a Routing Control Device that uses the Routing Label for address a Routing Control table that provides with the appropriate two-bytes bitmap information that can then be used for the internal routing process inside the switch cores.

Figure 3:
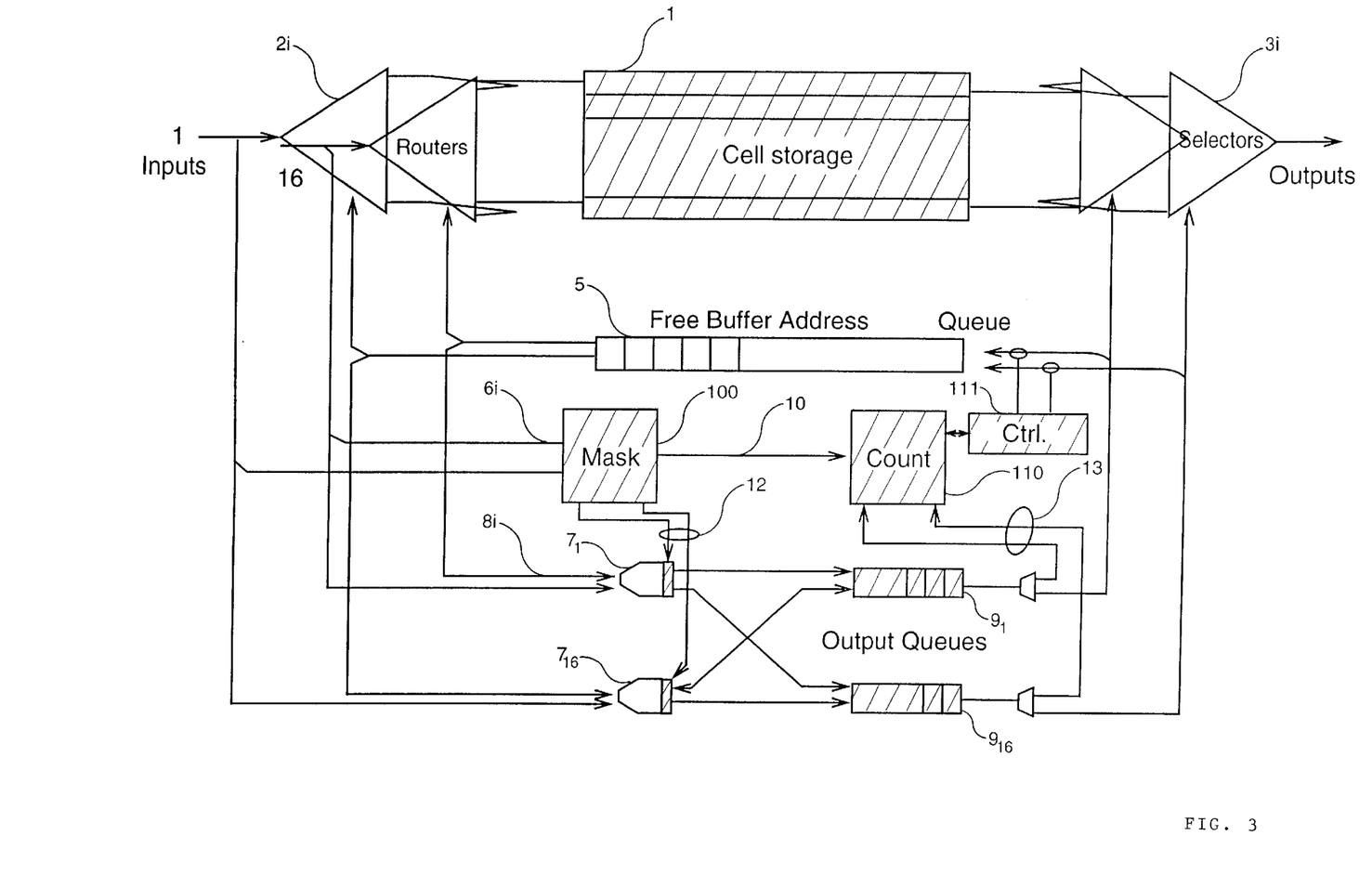
FIG. 3 illustrates an internal structure of a self-routing switching module that can be used in the preferred embodiment of the invention.

In the teaching of the present invention, an additional mask mechanism is used inside each Switch core, for processing the bitmap provided by the Routing Control device before the latter is used for controlling the routing process. FIG. 3 is a schematics view of the structure of a Switch core element forming the basis of the Switch core 15 or 25. A set of 16 input ports can provide cell into a Cell storage 1 via 16 corresponding routers 2-i. The cells can be extracted from the Cell storage and transferred to the output ports via 16 Selectors 3-*i*. When a cell is entered into the Switch element, a Free buffer Addresses is retrieved from a Free Buffer Address Queue 5, and the incoming cell is routed to the appropriate location within the Cell storage defined by the address that was extracted. Simultaneously, the Switch routing header is extracted from the incoming cell and transmitted through a bus 6-*i* to a Mask circuit 100. The latter Mask circuit 100 uses the SRH value provided in order to generate a corresponding 2 bytes mask value which will be provided to a set of 16 gating systems (only gating 7-1 and 7-16 being illustrated). At the input of the gating systems 7-*i*, via bus 8-*i*, there is presented the address where the cell is being loaded within Cell storage 1. That address is loaded into one or more Output Queues 9-1 to 9-16 corresponding to the appropriate output where the cell will have to be routed. When the cell is a multicast cell, the Mask circuit 100 provides to Count circuit 110 the number of duplication if of the cell via bus 10.

The outgoing process involves the reading of an address in the Output Queue 9-*i*, corresponding to the address of storage of the cell within Cell storage 1. This address is then presented to the Selector 3-*i* and the cell can be shifted to the appropriate output i. Bus 13 permits the transmission of that address to the Count circuit 110 which performs a decrementation operation corresponding to a single duplication of the cell. When the cell has been outputted to every appropriate output ports, the result of the decrementation is zero, what releases the address which becomes available for the storage of a new cell. At that moment, the released address can be loaded into the Free Address QUEUE 5 under control of circuit 111.

Figure 4:
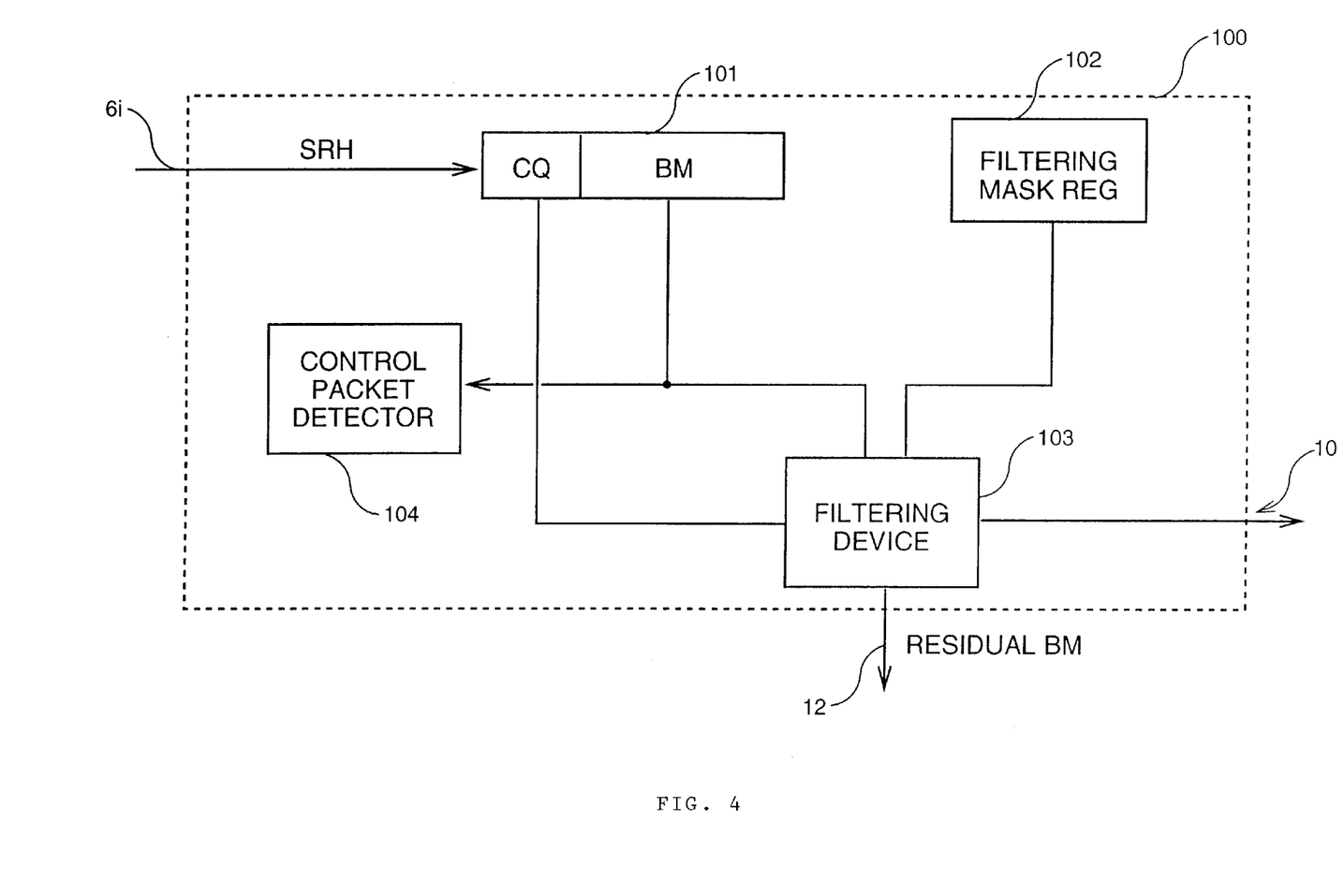
FIG. 4 illustrates a block diagram of the mask circuit used for performing a filtering control field process according to the invention.

With respect to FIG. 4 there is shown the preferred embodiment of the Mask circuit 100 which is used for performing the steps 403 to 409 of the Filtering Control Field process of FIG. 4. Basically, the SRH is loaded into a Register 101 via a bus 6-*i*, and a Filtering Mask Register 102 has been loaded by the control processor at the initialization of the circuit and contains the two-bytes mask that characterizes the distribution of the output ports in the two Left and Right groups. The detection of the Control packets (corresponding to step 403 of FIG. 5) is performed by circuit 104 which processes the contents of the bitmap field of Register 101. The Filtering Control Field in the Cell Qualifier Field is transmitted to the Filtering Device 103 with the value of the bitmap and that of the Filtering Mask register 102. The Filtering device can then provide with the residual bitmap that will be used by the gating circuits 7-1 to 7-16 so that the address of the cell being stored in Cell storage 1 is loaded into the appropriate Output Queues 9-*i* in accordance with the bitmap being carried by the cell, and processed in accordance with the Mask register contents. This achieves the cell routing in accordance with the Left and Right repartition of the output groups that were decided by the Node manager.

Figure 5:
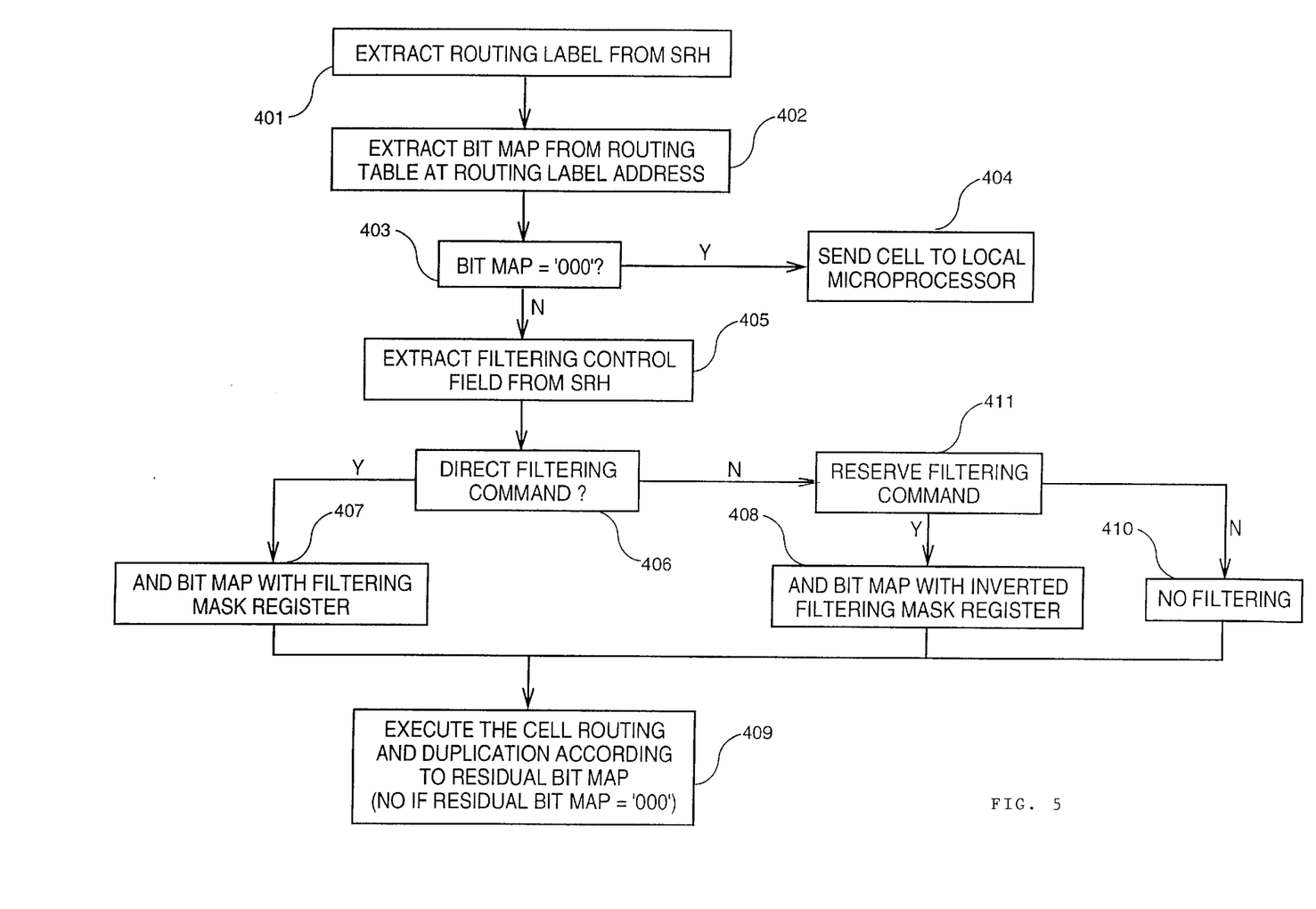
FIG. 5 is a flow chart describing the filtering control field process which is performed within each switch core.

With respect to FIG. 5 there is shown the Distribution process that is used for permitting the control of the two Left and Right Switch Cores. This process is being performed in every Switch Core by Mask circuit 100 as shown in FIG. 4.

The process in accordance with the present invention initiates with step 401 where the Routing label which is contained inside the SRH is extracted from the arriving cell. Then, in step 402, the Routing Label is used for addressing the Routing Table located inside the Switch Core, in order to extract the bitmap which is characteristics of the distribution of the considered cell to the appropriate output ports. It should be noticed that, since the same cell is received by the two Switch Core 15 and 25, step 402 causes the same value of bitmap to be extracted. In step 403 a test is performed in order to determine whether the extracted bitmap is equal to all zero, which is, by convention, characteristics of a control cell which is destined to the local internal processor and so must be extracted from the flow of data in step 404. If the cell is not a control cell, the process proceeds to step 405 where a Filtering Control Field process is initiated. For that purpose, the above mentioned Cell Qualifier comprises two particular bits forming a Filtering Control field which are characteristics of the nature of the filtering operation which is desired for this specific cell.

If the Filtering Control field is characteristics of a Direct Filtering operation, as determined by the step 406, then the process proceeds with step 407 where the Bitmap which was previously extracted is logically ANDed with the contents of the Filtering Mask register shown in FIG. 3. As mentioned above (with respect to FIG. 3), the Filtering Mask register is designed to store a Mask value which is composed, in the preferred embodiment of the invention, of sixteen-bit, with each bit corresponding to one particular output port of the considered Switch core. At the initialization of the Switching architecture, as explained above, the Port Adapter Xmit were distributed in two RIGHT and LEFT Groups. Since the node Manager is aware of the topology of the Switching architecture, and particularly the physical correspondence between each Port Adapter Xmit—either Left or Right—and the output ports of each Switch core, the value of the mask can be determined as follows: for Switch core 15: for each output port the corresponding bit of the mask is set to one when the SCAL Xmit element 12 has been determined to be active, that is to say is designed to transmit the normal flow of data to the considered Port Adapter Xmit. In other words, the bit of the mask that is assigned to a given output port of the Switch core 15 is set to one when the Port Adapter Xmit LEFT receives the cell from that specific port. On the contrary, when the SCAL Xmit element is known to be BACKUP, the corresponding bit is set to a zero. Conversely, for Switch core 25, the bit of the mask that is assigned to a given output port of that Switch core is set to a one when the Port Adapter Xmit Right receives the cell from that specific port. On the contrary, when the output port communicates with a SCAL Xmit element known to be BACKUP, the corresponding bit is set to a zero.

It should be noticed that the Filtering Mask Register of the two Switch cores 15 and 25 always contain Mask values that are complementary, so as to ensure that a perfect distribution of the cells through the two Switch cores.

With respect to the process of FIG. 5 again, when the test of step 406 shows that the nature of the Filtering Control Field is not characteristics of a direct filtering operation, the process proceeds with step 411. When the test of test 411 shows that the nature of the Filtering Control Field is characteristic of a reverse filtering operation, the process proceeds with step 408. Step 408, the Bitmap which was previously extracted is logically ANDed with the inverted value of the Filtering Mask Register. When the test of step 411 shows that the nature of the Filtering control Field is not characteristics of a reverse filtering operation the process proceeds to step 409 through step 410 (No operation).

Step 409 is performed at the completion of either step 407 or 408 or 410. The residual bitmap being masked in accordance with the above description is then used for controlling the internal routing of the cell inside the two Switch cores, and also permits the appropriate duplication of the cells in case of multicasting. It therefore appears that, in case of a cell carrying a Direct filtering command in its Filtering Control Field, that cell which is duplicated and provided to both Switch Fabric paths, is only transmitted (thanks to step 407) to the appropriate SCAL Xmit element which was determined by the node manager to be active. Conversely, for a its Cell carrying a REVERSE filtering command in its Filtering Control Field, that cell which is duplicated and provided to both Switch Fabric pats, is only transmitted (thanks to step 408) to the appropriate SCAL Xmit element which was defined to be BACKUP.

In the present invention, the DIRECT Filtering Command is used for the normal traffic of data while the REVERSE Filtering Command is reserved for testing purpose of the Backup path in order to prevent the dramatic disastrous caused by hidden failures. To achieve this, with the Switching structure of the invention, testing cells can be periodically injected in the structure and are then transmitted through the backup Switch path in order to ensure the good operating of the latter. This entails the important advantage to allow a whole testing of the backup components of the Backup path, including the Backup SCAL Xmit elements and all the Backup links, to make sure that, when a breakdown will happen on one side of the Switching architecture, the only remaining Switch core will be able to switch the totality traffic of cells.

Additionally, since the two Switch Cores are based on a output-shared buffer architecture, as shown on FIG. 3, the active and backup path arrangement in accordance with the present invention permits to virtually increase the size of the shared Cell storage as far as this Cell storage is used by a lower number of output ports. This strongly improves the overall performance of the switch.

The invention is enhanced by an additional mechanism which permits to avoid that two cells, a first DIRECT cell carrying normal and a second REVERSE testing cell, simultaneously arrive at the same Port Adapter Xmit. This is achieved by means a control bus 40-$j$ in FIG. 1 connecting the SCAL Xmit element 12-$j$, belonging to the Switch Fabric 10, to the SCAL Xmit element 22-$j$ belonging to the Switch Fabric 20. Therefore, two corresponding ACTIVE and BACKUP SCAL Xmit element which are connected to a same Port Adapter Xmit can communicate via the same control bus 40-$j$.

Bus 40 has two main functions: a first function consisting of the synchronization of the cell clock of the Backup SCAL Xmit element 22$m$ for instance with that of the clock of the it ACTIVE SCAL Xmit element 12($m$). In other words, the two links 34-$m$ and 35-$m$ have cell 16$d$. clocks which are synchronized. The characteristics of transmission of the two busses 34-$m$ and 35-$m$ ensures that the synchronism is maintained up to the input of the Port Adapter Xmit 31-$m$, what is generally the case when links 34-$m$ and 35-$m$ have the same physical length. When the Backup SCAL Xmit element 22-$m$ wishes transmit a cell on bus 35-$m$, the latter sends a request on bus 40$m$ to its associated ACTIVE Scal Xmit element 12-$m$. That request is received by ACTIVE Scal Xmit element 12-$m$ which inhibits the transmission of the cell which would normally be transmitted at the next cell cycle. Concurrently ACTIVE Scal Xmit element 12-$m$ produces an Acknowledge signal to its associated Backup Scal Xmit element 22-$m$ on bus 40-$m$, what informs the latter that it is allowed to use the link 35-$m$ to convey the pending cell at the next cell cycle. Each of the above two ACTIVE and BACKUP mechanisms are enabled in response to the contents of a register defined, under control of the Node manager, the appropriate status of the SCAL Xmit element. The mechanism thus prevents the simultaneous arrival of two cells at the same Port Adapter Xmit and entails a substantial advantage since the Port Adapter Xmit can be designed to support only its nominal throughput. Without that mechanism it would have been necessary to use adapters being capable of supporting at least twice the nominal throughput, what would have strongly increased the cost and complexity.

Now it will be described how the architecture permits easily maintenance operation, such as card replacement or system upgrade on one of the two Left or Right side, without loss of cells, erroneous duplication of cells, disordering of cells and excessive cell delay variations. It should be noticed that this requirement is particularly difficult to satisfy in the case of a very large switching architecture where the different constituents, the Switch Cores and the different SCAL elements are located in different physical areas.

Port Adapter receive 30-$i$ generates, as shown in the FIG. 2, a sequence of cells cell(1)-cell(2) . . . cell(n) (only three cell being illustrated), which are duplicated and simultaneously transmitted to the two SCAL Receive elements 11-$i$ and 21-$i$. It should be noticed that that sequence of cells may well include a sub sequence of ordered cells which are representative of a particular source of data, e.g. voice or image, and which must absolutely be transported to the appropriate Port Adapter Xmit, 31-$m$ for instance, and delivered with the correct order and cell delay variation even if the normal direct traffic is switched to the backup path. This is achieved by the process of the invention which comprises the following steps: During the normal state, and in every components of the Switching architecture, there are data cells with the Filtering Control field characteristics of Direct Filtering and data cell with the Filtering Control field characteristics of Reverse Filtering and filling cells (empty cells) which are generated in the interconnecting link when there is no data cell to be transmitted.

Assuming that the objective of the operation is to withdraw the Active SCAL Xmit element 12-$m$ which is located in the Left Switch Fabric 10 for maintenance operation. In a preliminary step, the node manager sends to all the components located into the Right Switch Fabric and the Left Switch Fabric the relevant parameters corresponding to the new configuration obtained after the path switch-over. At the same time the Node manager sends to all the Port Adapter Receive a particular command to stop the transmission of the test cells carrying the Reverse Filtering Control field.

After a predetermined period fixed in order to let all the remaining Reverse Filtering Control field be transmitted to their appropriate destination, the process basically begins with the transmission of a physical Left Switch Over Request (L_SOV_R) signal to all the components located in the two Switch Fabrics 10 and 20.

Depending of the physical transmission characteristics the different SCAL—including the Receive and Xmit elements—receive that information at substantially different instants because of the existence of different propagation delays through the different links. It should be noticed that, generally speaking, the SCAL elements can be located in a different physical area with respect to the centralized Switch cores and the distance may well exceed several hundred of meters. Nevertheless, the SCAL receive elements 11-$i$ and 21-$i$ and the SCAL Xmit elements 12-$i$ and 22-$i$ receive that L_SOV_R signal at the same instant since they are located in the same back plane or physical entity. From the reception of the L_SOV_R signal, each component of the Switch Fabrics 10 and 20, excepted Backup SCAL Xmit element 12$n$ and Active SCAL Xmit element 22$n$, initiates a particular process. The functional state of the latter Backup SCAL Xmit element 12n and Active SCAL Xmit element 22n will not involve the process which is now described.

As mentioned above, the following components of the switching architecture performs an appropriate process for achieving the switch subsystem reconfiguration: the SCAL receive elements 11-i and 21-i, the SCAL Xmit element 12-i and 22-i, the Switch core 15 and 25 and the different control processors used in the architecture.

However, the different processes can be grouped in three main phases which are consecutively performed. A first phase comprises the individual processes for achieving the merging of all the traffic of cells which was previously balanced between the two switch fabrics 10 and 20 so that the latter is exclusively flowing in the second one, that is fabric 20. That first phase basically involves the hardware components of the switch architecture.

Following the first phase, a second phase groups the individual processes achieving the installation of the new configuration with the parameters which have been provided by the Node manager during the above mentioned preliminary phase.

A third phase completes the overall switch subsystem reconfiguration achieves the load balancing between the two switch fabric 10 and 20 with the new configuration which will permit the particular maintenance operation on the system architecture.

I. First Phase for Traffic Merge of the Cells

Each element involved in the first phase initiates, as described below, its individual process from the monitoring of the L_SOV_R signal since the maintenance operation involves it the left switch fabric 10. However, should the latter involves the right switch fabric 20, the R_SOV_R (right switch over request) would have been involved. The following description will be made with the assumption that the maintenance operation is made on the left switch fabric, and therefore, all the elements of the first phase monitor the raising edge of the L_SOV_R signal.

The individual process performed in Active SCAL Xmit element 12-m begins with the detection of the raising edge of the L_SOV_R signal, the latter switches to a state where any request from the associated Backup SCAL Xmit element 22-m will not be acknowledged. This obviously causes the locking of the output of Backup SCAL Xmit element 22-m. This locking of Backup SCAL Xmit element 22-m will be useful during the next processing steps in order to avoid cell disordering.

The individual process performed by SCAL Receive element 11-i also begins with the raising edge of L_SOV_R signal. On detection of the latter, there is produced a Disable input signal which prevents the input of the cells which come from Port Adapter Receive 30-i. Simultaneously, the latter replaces the production of the filling cells by a production of particular cells, so called Dummy cells, which have a specific representation. In the preferred embodiment of the invention, the Dummy cells have a particular SRH value characterizing that cell, and different from the value of the SRH which is assigned to the filling cells, because it is absolutely necessary to distinguish the two cells. Obviously, SCAL Receive element 11-i produces the Dummy cells only when, normally it would have been produced the filling cells, that is to say when no normal data cell are to be transported. After a certain period, the link 13-i only transmits Dummy cells which are inputted into Switch core 15.

On the occurrence of the raising edge of L_SOV_R signal, the SCAL Receive element 21-i initiates its own appropriate process which modifies the SRH of every incoming cell in order to modify the two bits of the filtering control field from the Direct Filtering Command value, to the No_filtering Command value. Simultaneously its replaces the production of the filling cell by a production of particular cells, so called Dummy cells, as described above. It should be noticed that the first cell comprising a No_filtering command in its filtering control field, or the first Dummy cell occuring, will be transmitted on the bus 23-i only when all the cells which were possibly in the intermediate queues of the SCAL have been transmitted. This mechanism prevents the interleaving of a cell comprising No_filtering command with one that comprises direct filtering command.

Switch cores 15 and 25 monitor the raising edge of the L_SOV_R signal and perform a similar processing. Considering Switch core 15 for instance, each input port i is associated with a detector which is designed for detecting the arrivals of a Dummy cell or of a cell characterized by a No_filtering command in the filtering control field. When the last of the sixteen detectors being associated with its corresponding input port of Switch core 15 has made that detection, Switch core 15 replaces the production of the filling cell by that of Dummy cell as required, that is to say when the output queues comprised in the Switch core 15 have delivered the useful data cells. It should be noticed that the process is independently performed with respect to the output ports. Therefore, after a certain period, it appears that Switch core 15 continuously produces Dummy cells on each output port and, on the other side, the Switch Core 25 continuously produces on the output ports Dummy cells and cell comprising No_filtering command.

Simultaneously with the detection of the last of the sixteen detectors in a Switch core, an internal control signal is transmitted to the control processor therein located. That signal informs the control processor that the traffic within the considered Switch core is such that the configuration parameters can be changed without prejudicial damage on the traffic. From that instant, control processor may initiate the processing of the second phase, that is to say, the installation of the new configuration.

It should be noticed that that mechanism could be advantageously used when the switching architecture is based on a port expansion structure as described with details in pending European patent application n° 97480100.3, entitled "Method and apparatus for managing contention in a self routing switching architecture in a port expansion mode" and assigned to the assignee of the present application. When in port expansion architecture, the detection of last of the sixteen detectors in a same switch core is reported by means of a ALL_Detect signal to the Arbitration mechanism that manages the fan-in circuit merging the cells of two corresponding switch cores. From that instant, the Arbitration mechanism modifies its arbitration algorithm so that the corresponding fan-in circuit receive the cells coming from the opposite Switch core. As soon as the Arbitration mechanism receives the second ALL_Detect signal from the opposite Switch core, it switches back to the normal arbitration algorithm. This prevents spurious Dummy Cells occurrence.

When SCAL Xmit Active element 12-m detects the arrival of the first Dummy cell which is normally preceding an entire flow of dummy cells and when, additionally, no cell to be transmitted remains in its queuing buffer, the latter switches back to a state wherein it will acknowledge the requests of the associated backup SCAL Xmit element 22-m. This obviously results in the unlocking of the output of SCAL Xmit backup 22-*m*, but has the strong advantage of preventing any misordering. This is also reported to the internal control processor located into the SCAL active Xmit element. The latter processor is then made aware that the processing of the second phase can be initiated without any loss of data.

The last component involved in the first phase is the backup SCAL Xmit element 22-*m* which, on detection of the L_SOV_R signal, performs the unique step of checking whether it has been unlocked by the SCAL Xmit active 12-*m*. The result of that checking is reported to the internal processor that is located within the SCAL Xmit element 22-*m* and the latter is then made aware that the second phase may be initiated without any loss of data II. Second Phase for New Configuration Installation The second phase is initiated at the expiration of a certain period after the detection of the rising edge of L_SOV_ request signal, what signal is, as mentioned above, monitored by any components within the switching architecture.

Each control processors being located in one of the two switch cores 15 or 25 verify to have received the above mentioned internal control signal generated in response to the detection by the last of the sixteen detectors of the Dummy cells and/or no_Filtering cells. If this test fails, an error condition will be reported to the Node manager but the process goes on. In every Switch core 15 or 25, the internal processor modifies the value of the Filtering Mask Register in accordance with the new configuration parameters that are provided by the Node manager during the preliminary phase. This allows the modification of the repartition of the Port adapters in the group left and Right. Since the maintenance operation is assumed to occur on the SCAL Xmit element 12-*m*, the corresponding Port Adapter Xmit 31-*m* must be reassigned to the Right Group in order to receive its data from the Switch Fabric 20. It should be noticed that, thanks to the phases that occurred before, the contents of the Mask Registers can be changed without problem since, in the left switch core 15 only Dummy cells are being processed and, in the second Right Switch core 25, only cells bearing a no_filtering command are routed without involving the filtering control process.

Similarly, each control processor being located into the active SCAL Xmit element 12-*m* verify to have received the internal control signal that was generated in response to the detection of the first Dummy cell. If this test fails, en error condition will be reported to the Node manager. Then, each internal processor modifies the internal parameter defining status ACTIVE/BACKUP of the considered SCAL Xmit element, as defined above. From this instant, the latter is assigned and operates in its new configuration, and the direction of control signal on bus 40 m is set in accordance with the new configuration. For instance, since the maintenance operation is being envisaged on SCAL Xmit element 12-*m*, the latter is set to a Backup state. Similarly, each control processor being located into the backup SCAL Xmit element 22-*m* verify to have received the internal control signal generated when it has been unlocked by the SCAL Xmit active 12-*m*. If this test fails, en error condition will be reported to the Node manager. Then, each internal processor modifies the internal parameter defining status ACTIVE/BACKUP of the considered SCAL Xmit element, as defined above. From this instant, the latter is assigned and operates in its new configuration, and the direction of control signal on bus 40 m is set in accordance with the new configuration. For instance, since the maintenance operation is being envisaged on SCAL Xmit element 12-*m*, the SCAL Xmit element 22-*m* is set on a complementary active set.

When the expiration of the period of the first phase occurs, SCAL Xmit backup 12-*n* and SCAL Xmit backup 22-*n*, which were not involved during the first phase, update their active/backup status according to the parameter provided by the Node manager during the preliminary phase.

The second phase then completes, and it becomes possible to perform any maintenance operation on the switch fabric left since all the traffic is routed through the right side. In particular the SCAL Xmit element 12-*m* may be unplugged and replaced by another one.

It should however be noted that, during that maintenance operation, the right switch path is completely unprotected since a failure might happen on any of its components. Since the maintenance operation might takes a long time, this is a serious drawback.

The invention improves that situation by providing an optional third phase which strongly improves the efficiency of the subsystem reconfiguration. The third phase permits the reconfiguration of the subsystem in a state where the maintenance operation will be permitted on one particular element, while the remaining components of the subsystem will still be used in a load balancing and protected mode.

III. Third Phase Traffic Split

The second phase causes a new assignment of elements to the right and left Groups. Therefore the lists of the components belonging to the Right Group (referenced by index m), and that belonging to the Left Group (re. index n) may have changed, at least from one unit. The third phase is then necessary to complete the load balancing and protected mode.

The third phase is triggered by the failing edge of the L_SOV_R. From the reception of the falling edge of the L_SOV_R signal, each component of the Switch Fabrics 10 and 20, excepted Backup SCAL Xmit element 12-*n* and Active SCAL Xmit element 22-*n* initiates a particular process. The functional state of the latter Backup SCAL Xmit element 12-*n* and Active SCAL Xmit element 22-*n* will not involve the process which is now described.

The individual process performed in the backup SCAL Xmit element 22-*m* begins with the detection of the falling edge of the L_SOV_R signal, the latter causing the locking of the SCAL Xmit active element 12-*m* via bus 40-*m*.

The individual process performed by the SCAL Receive elements 11-*i* and 21-*i* also begins with the detection of the falling edge of the L_SOV_R signal. On detection of the latter, there is produced a Enable input signal which allows the reception of the cell on the port adapter 30-*i*. From that instant, the cells which are received from Adapter 30-*i* are no longer modified. The production of the Dummy cells is being replaced by that of the normal Idle cells (filling cells).

Switch cores 15 and 25 monitor the falling edge of the L_SOV_R signal. Considering Switch core 15 for instance, each input port i is associated with a detector which is designed for detecting the arrival of idle cells or of cells being characterized by direct filtering command in the filtering control field. When the last of the sixteen detectors that are associated with its corresponding Input port of Switch core 15 has made the last detection, Switch core 15 replaces the production of Dummy cells by that of Idle cells as required. Simultaneously with the detection of the last of the sixteen detectors in a Switch core, an internal control signal is transmitted to the control processor therein located, to inform the latter that, at it that level, the third phase is completed.

When SCAL Xmit Backup element 22-*m* detects the arrival of the first Idle cell or the cell with Direct filtering Command in the Filtering Control field, and when, additionally, no cell to be transmitted remains in its queuing buffer, the latter removes the lock command to the SCAL Xmit element Active 12-*m* from the bus 40-*m*. This detection is reported to the internal control processor which is located in the Backup SCAL Xmit element 22-*m* to inform the latter that, at that level, the third phase is being completed.

The last component involved in the third phase is the Active SCAL Xmit element 12-*m* which, on detection of the falling edge of the L_SOV_R signal, performs the unique step of checking whether it has been unlocked by the SCAL Xmit backup 22-*m*. The result of that checking is reported to the local control processor that is included into SCAL Xmit element 12-*m*, to inform it that, at that level, the third phase is being completed.

Therefore, the subsystem is then set to the situation where the Port adapter in the Right group receives the data from the Right Switch Fabric 20 and the Port adapters of the Left Group receive their data from the Left Switch Fabric 10.

It has been explained with numerous details the different steps of procedure for permitting an maintenance intervention on the SCAL Xmit 12-*m*. As described above, the procedure involves the preliminary phase wherein the Node manager sends to all the involved components the new configuration, followed by the three consecutive phase allowing the traffic merge, the installation of the new configuration and then traffic split.

Now it will be quickly described the case where the maintenance intervention occurs on the Switch core 15, or on the SCAL receive element 11-*i*.

Regarding the Switch core 15, the preliminary phase and the first traffic merging phase remains unchanged. In the second phase is however modified. The second phase is however slightly modified so as to permit all the traffic to be concentrated through switch core 25. To achieve this, during the determination of the repartition of the Port Adapter Left and Right by the internal processors located in the Switch core 15 and 25, the Left Group will be declared to be empty whereby no cells will be conveyed through Switch core 15. The filtering Mask Register is thus set to a All_zero value in Switch core 15, and that in Switch core 25 is fixed to a All_one value. After the completion of the third phase, the cells which transport a Direct Filtering Command in the Filtering Control Field will be conveyed through the Switch Core 25. An intervention on Switch core 15 is then made possible without altering the traffic of normal data cell.

Regarding now the manual intervention on the SCAL Receive element 11-*i*, the preliminary phase remains unchanged with respect to the procedure described for the maintenance of SCAL Xmit element 12-*m*. The first phase of traffic merge is initiated, as described above. Then the second phase of new configuration installation is involved with the following modification: the SCAL receive element 11-*i* is set to a Disable mode which will be used in the following third phase, and the SCAL Receive element 21-*i* is set in a SIMPLEX mode. Therefore, during the third split traffic phase, after detection of the falling edge of the L_SOV_R signal, SCAL Receive element 11-*i* , previously set in a DISABLE mode, continues to disable the reception of the cells from the Port Adapter 30-*i* but replaces the production of the Dummy cells by a continuous flow of Idle cells (filling cells). Similarly, the SCAL receive element 21-*i*, previously set on SIMPLEX mode, continues to modify the two bits of the filtering control Field of the incoming cells from the direct Filtering Command value by the No_filtering command value. Simultaneously, it replaces the production of the Dummy cell as filling cells by Idle cells.

What is claimed is:

1. A switch system including:

a first switch fabric having a first switch core and a first switch core access (SCAL) layer, said first switch core access layer having a SCAL receive element connected to an input port of said first switch core and a SCAL transmit element connected to an output port of said first switch core;

a second switch fabric having a second switch core and a second switch core access (SCAL) layer, said second switch core access layer having a SCAL receive element connected to an input port of said second switch core and a SCAL transmit element connected to an output port of said second switch core;

a set of receive port adapters, each adapter in said set being connected to the SCAL receive element in said first switch fabric and to the SCAL receive element in said second switch fabric;

a set of transmit port adapters, each adapter in said set being connected to the SCAL transmit element in said first switch fabric and to the SCAL transmit element in said second switch fabric; and switch control logic for assigning each port adapter in each of said sets of receive and transmit port adapters to one of said switch fabrics for normal data traffic operations and to the other of said switch fabrics in response to the subsequent unavailability of said one switch fabric.

2. A switch system as defined in claim 1 wherein each of said switch cores further comprises:

a routing table;

read logic for extracting a switch routing header (SRH) from each cell received at said switch core;

addressing logic for addressing the routing table in said switch core using the extracted SRH value to retrieve a bitmap value identifying each output port to which the cell is to be routed;

mask logic for altering said bitmap value in accordance with the contents of a mask register; and routing control logic for controlling the routing of cells in accordance with the altered bitmap value.

3. A switch system as set forth in claim 2 wherein the mask registers associated with the two switch cores contain complementary values.

4. A switch system as set forth in claim 2 and further comprising:

a backup SCAL transmit element coupled to an output port of said first switch core and to the transmit port adapter of said set of transmit port adapters which is other than the transmit port adapter connected to the SCAL transmit element in said first switch fabric; wherein said mask logic responds to a value of a filtering control field extracted from the SRH of each received cell, said filtering control field carrying a direct filtering operation command reserved for controlling the mask logic during normal data traffic operations and a reverse control field for controlling the routing of the cell including filtering control field to the port adapter via said backup SCAL transmit element.

5. A switch system as set forth in claim 4 further including test logic for periodically introducing testing cells having a reverse control field into the system to test the operation of the backup SCAL transmit element.

6. A switch system as set forth in claim 5 further including a control bus connecting said SCAL transmit elements, said control bus carrying control signals which prevent the simultaneous transmission of a cell by two SCAL transmit elements attached to the same port adapter.

7. A switch system as set forth in claim 6 further including:
- means activated in advance of any planned maintenance operation on a particular SCAL transmit element for stopping the transmission of test cells and for loading a new configuration for traffic which excluded the particular SCAL transmit element on which maintenance is to be performed;
- means for rerouting cells which would have normally be transmitted through the particular SCAL transmit element to the other of the switch fabrics;
- means for installing the new configuration with new parameters; and
- means for establishing load balancing between the two switch fabrics excluding the particular SCAL transmit element on which maintenance is to be performed.

8. A switch system including:
- a plurality of switch fabrics, each having a switch core and a switch core access (SCAL) layer, each said first switch core access layer having a SCAL receive element connected to an input port of said switch core and a SCAL transmit element connected to an output port of said switch core;
- a set of receive port adapters, each receive port adapter in said set being connected to the SCAL receive element in each switch fabric in said plurality of switch fabrics;
- a set of transmit port adapters, each transmit port adapter in said set being connected to the SCAL transmit element in each switch fabric in said plurality of switch fabrics; and
- switch control logic for assigning each port adapter in each of said sets of receive and transmit port adapters to one of said switch fabrics for normal data traffic operations and to another of said switch fabrics in response to the subsequent unavailability of said one switch fabric.

* * * * *